United States Patent [19]

Kreeger et al.

[11] Patent Number: 4,590,884
[45] Date of Patent: May 27, 1986

[54] PORTABLE POWDER SPRAY SYSTEM

[75] Inventors: Ken Kreeger, Avon Lake; Gene Tank, Amherst, both of Ohio

[73] Assignee: Nordson Corporation, Amherst, Ohio

[21] Appl. No.: 732,424

[22] Filed: May 9, 1985

[51] Int. Cl.⁴ .............................................. B05D 15/12
[52] U.S. Cl. .................... 118/308; 118/629; 118/631; 118/312; 118/326; 55/356; 98/115.2
[58] Field of Search ............... 118/629, 631, 308, 312, 118/326; 55/356; 98/115.2

[56] References Cited

U.S. PATENT DOCUMENTS

| | | | |
|---|---|---|---|
| 3,719,030 | 3/1973 | Blankemeyer et al. | 55/356 X |
| 4,277,260 | 7/1981 | Browning | 118/326 X |
| 4,354,451 | 10/1982 | Vohringer et al. | 118/326 |
| 4,378,728 | 4/1983 | Berkmann . | |
| 4,401,445 | 8/1983 | Browning | 118/326 X |
| 4,498,913 | 2/1985 | Tank et al. . | |
| 4,506,625 | 3/1985 | Vohringer | 118/326 |

Primary Examiner—Shrive P. Beck
Attorney, Agent, or Firm—Wood, Herron & Evans

[57] ABSTRACT

A portable powder spray apparatus for use in combination with a floor supported chain-on-edge conveyor. The apparatus includes a powder spray booth, a fan plenum and a filter module, all of which are mounted upon rollers so that the assembled apparatus may be rolled on or off line relative to a horizontal span of the conveyor.

8 Claims, 5 Drawing Figures

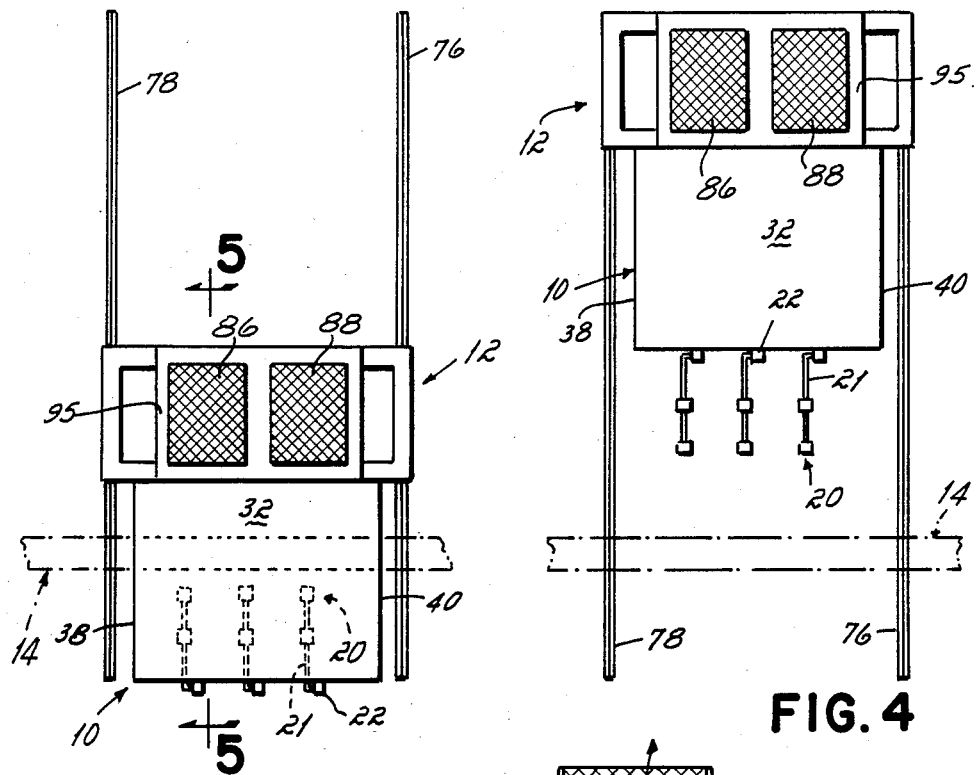
FIG. 3
FIG. 4
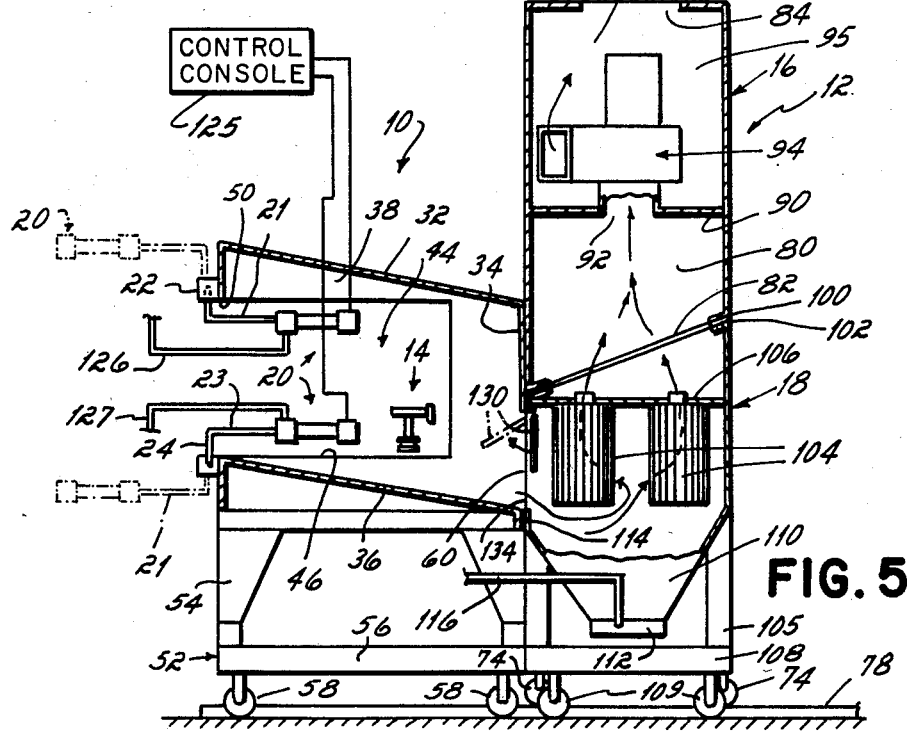
FIG. 5

PORTABLE POWDER SPRAY SYSTEM

This invention relates to a powder spray system, and more particularly, to a powder spray system for use in association with a rotating spindle conveyor for transporting workpieces through the powder spray booth of the system.

Powder spray systems are well known in the art. One such powder spray system is disclosed in U.S. Pat. No. 4,378,728.

As disclosed in that patent, products or workpieces to be painted are conveyed through a powder spray booth. An electrostatic spray gun receives paint particles in powdered form from a feed hopper and dispenses them into the spray booth against the product to be painted. Not all of the powdered particles adhere to the product. Those not adhering are entrained in air flowing through the powder spray booth to a powder collector. In the powder collector, the particles are separated from the air by a filter medium. From time to time, the particles are either vibrated off the filter medium or reverse air flow is directed through the filter so as to cause the powder to fall into a collection hopper located beneath the filters. Powder pumps and hoses are provided for conveying the particles from the collector hopper back to the feed hopper.

As disclosed in the above-identified patent, the product to be painted in the booth is traditionally transported through the booth while suspended from an overhead conveyor. Product has in the past and as part of the prior art also been transported through powder spray booths while the product was rotatably supported upon a floor-mounted horizontal spindle conveyor. Such conveyors are operative to rotate the product while the product is transported past powder spray guns located within the booth. In the past, whenever powder booths were used in association with horizontal spindle conveyors, the powder spray booth has been built around the floor-mounted spindle conveyor. In that event, the booth became an integral part of the conveyor with the result that it was very difficult to clean the booth and conveyor for purposes of changing from one color powder paint to another. Additionally, the building of the booth around the conveyor has in the past made the manufacture and assembly of the booth complicated and expensive.

It has therefore been an objective of this invention to provide an improved powder spray system usable in combination with floor-mounted spindle conveyors which can be more easily and quickly cleaned in the event of a color change.

Still another objective of this invention has been to provide an improved powder spray system for use in combination with a floor-mounted spindle conveyor which is less expensive and less complex to manufacture than prior art powder spray booths and collector systems.

These objectives are achieved according to the practice of this invention by providing a booth which can be rolled over and below the span of a floor-supported spindle conveyor so as to position the booth around the conveyor while still enabling the booth to be rolled off-line for easy access and cleaning. Typically, two such booths would be used so as to enable one booth to be rolled onto the conveyor line while the other was off to the side being cleaned.

Yet another aspect of this invention is predicated upon the concept of having a movable booth and air plenum in combination with a separately-movable filter module, all components of which are movably mounted upon floor-supported rollers. This construction enables the booth, air plenum and filter module to be moved relative to a conveyor. Alternatively, the booth, air plenum and filter module may be separately mounted upon rollers and so interconnected that the booth, plenum, and filter module may all be separated from one another, again for ease of access and cleaning of the components.

These and other objects and advantages of this invention will be more readily apparent from the following description of the drawings in which:

FIG. 3 is a top plan view of the system illustrated in FIG. 1;

FIG. 4 is a view similar to FIG. 3 but illustrating the booth, air plenum and powder collector rolled off line relative to the conveyor upon which product is moved through the booth; and FIG. 5 is a cross-sectional view taken on line 5—5 of FIG. 3.

Figure 1:
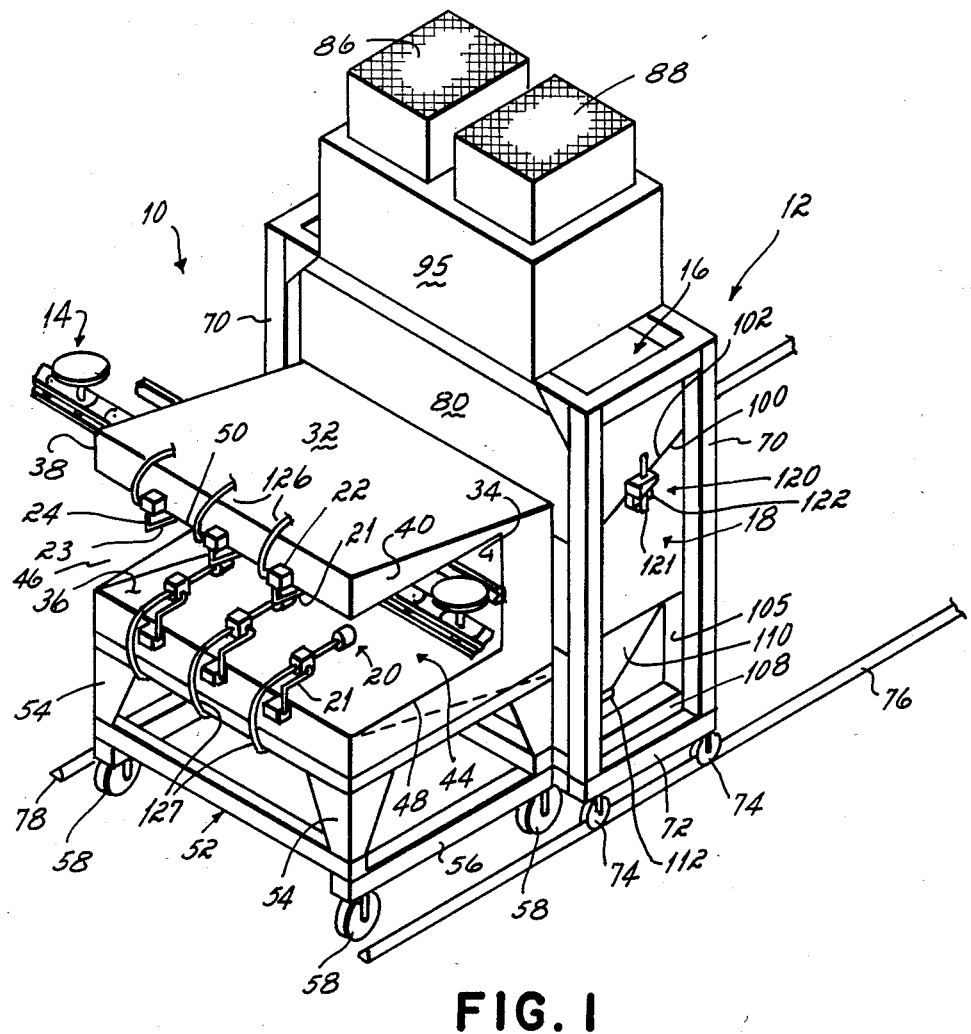
FIG. 1 is a perspective view of the preferred embodiment of the invention comprised of a powder spray system including a powder spray booth permanently attached to an air plenum with a filter module separable from the booth/air plenum unit.

With reference to FIG. 1, there is illustrated a powder spray system incorporating the invention of this application. This system includes a powder spray booth 10 and a powder collector 12, both of which are mounted upon rollers so as to facilitate movement of the booth and collector into and out of alignment with a rotatable spindle conveyor 14. The powder collector 12 includes a fan plenum 16 and a filter module 18. In the preferred embodiment, the filter module is separately movable upon its own set of rollers into and out of vertical alignment with the fan plenum as is conventional in the prior art and fully described in U.S. Pat. No. 4,498,913 assigned to the assignee of this application.

The rotatable spindle conveyor 14 is a conventional conveyor for transporting workpieces through a powder spray booth while rotating those workpieces relative to spray guns 20 from which powder is sprayed onto the rotating workpieces. Such conveyors are commonly referred to as "chain on edge conveyors" and generally comprise an endless chain from which there extend vertical spindles. Each spindle has a roller associated therewith and engageable with a stationary bar as the spindle moves through the booth on the chain. The engagement of the roller with the stationary bar effects rotation of the roller and attached spindle and the workpiece resting atop that spindle.

The conveyor 14 is supported from the floor upon stanchions or vertical supports (not shown) and has unsupported horizontal spans five or six feet in length. The booth 10 of this invention is intended to slide over and under these unsupported spans when the booth is moved into and out of alignment with the conveyor 14.

The booth 10 comprises a top wall 32, a rear wall 34, a bottom wall 36, side walls 38 and 40, and a front wall 42. A spray chamber 44 is defined internally of these walls.

Figure 2:
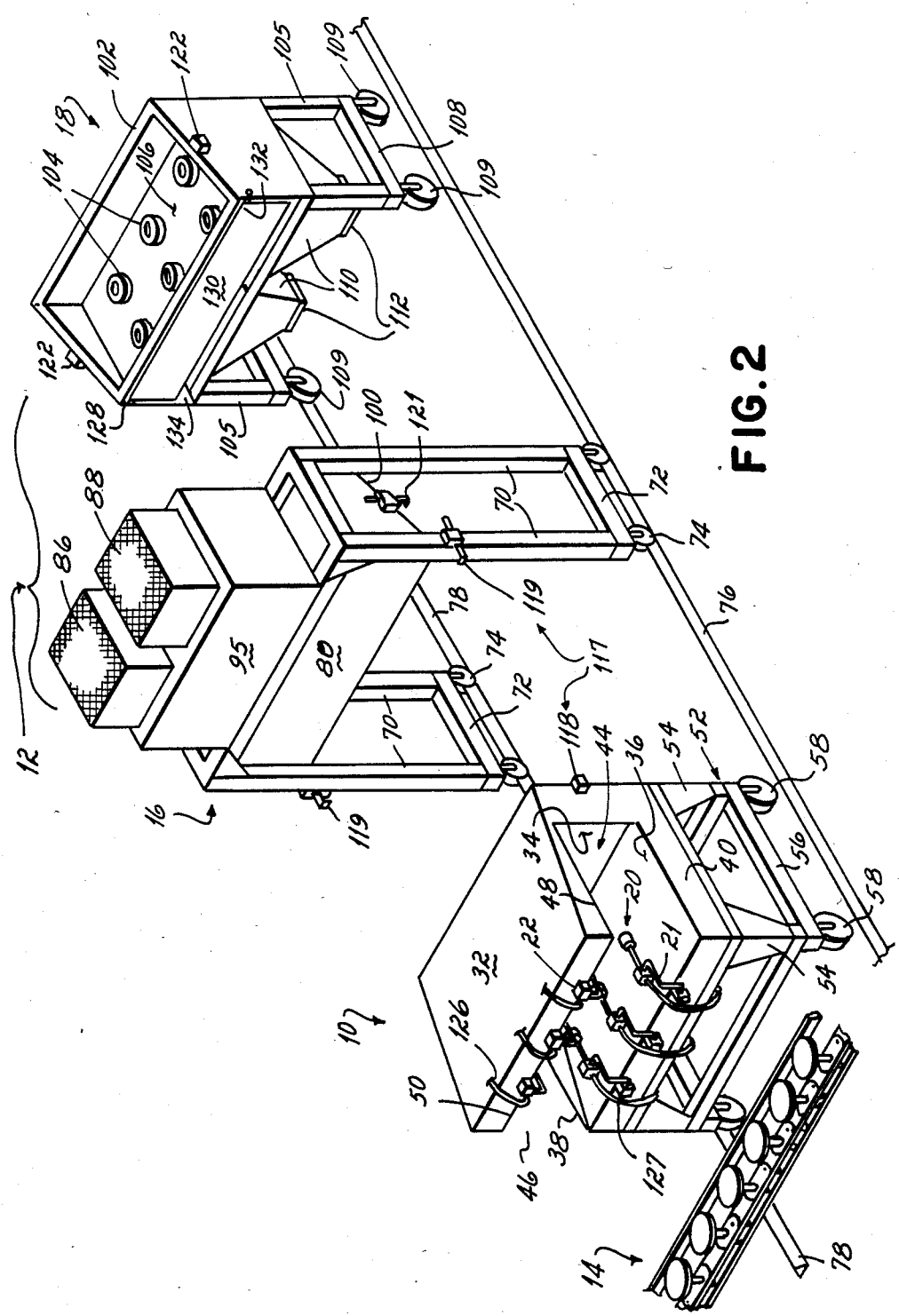
FIG. 2 is an exploded perspective view of another embodiment of the invention which is identical to the FIG. 1 embodiment except that the air plenum is separable from the spray booth.

In the presently preferred embodiment, the walls are made of an electrically non-conductive material to enhance electrostatic spray efficiency by not attracting the powder to the walls of the spray chamber in the manner that powder would be attracted if the walls were made of electrically conductive material which was electrically grounded. With reference particularly to FIGS. 1 and 2, it will be seen that each of the side walls 38 and 40 has a large side opening 46, 48 which extends from the front wall to a point near the rear wall. Additionally, the front wall 42 has a large opening 50 which extends between the side walls and is coextensive with the side wall openings 46 and 48. These openings 46, 48, 50 enable the booth to be moved over or withdrawn from alignment with the conveyor 14 by passing the conveyor through the side wall and front wall openings 46, 48 and 50.

The booth 10 is supported by a base 52 which comprises side supports or legs 54 and a rectangular frame 56 extending between the legs 54. Rollers 58 are attached to the underside of the rectangular frame 56 at the four corners thereof so as to enable the booth to be rolled into and out of alignment with the conveyor 14 and/or the collector 12.

The rear wall 34 of the booth has a large rectangular opening 60 which extends between the side walls 38 and 40 and upwardly from the rear edge of the bottom wall 36 to a point very nearly one-half the height of the rear wall. As explained more fully hereinafter, this large rectangular opening interconnects the interior of the booth with the interior of the filter module when the filter module is moved into engagement with the rear wall of the booth.

The fan plenum 16 is supported above the floor by four vertical corner supports 70. Cross braces 72 interconnect the bottoms of these four corner supports on each side of the fan plenum. Rollers 74 on the underside of these cross braces rest atop and are rotatable over a pair of floor-mounted side rails 76, 78 located on the opposite sides of the plenum.

The fan plenum comprises a plenum chamber 80 contained internally of a sheet metal housing mounted atop the corner supports 70. This sheet metal housing is open at the bottom as indicated at 82. Additionally, the housing has a pair of top openings 84 within which there are mounted a pair of final filters 86, 88. Internally of the plenum, the chamber 80 is divided into upper and lower sections by a horizontal divider wall 90 having an opening 92 therein. A conventional fan or blower 94 is mounted within the plenum over the opening 92 so that the fan may draw air into the fan 94 from the lower chamber and exhaust it into the upper chamber 95. That exhausted air from the fan then flows out of the plenum through the final filters 86, 88.

The fan plenum 16 may be permanently secured to the spray booth by any suitable connector or, as illustrated in the FIG. 2 embodiment, the fan plenum may be separable from the booth.

As may be seen most clearly in FIG. 2, the plenum has a lower edge 100 which lies in a plane inclined at an angle of about 30° to a horizontal plane or to the floor.

The filter module comprises a sheet metal enclosure which is open at the top and within which there are mounted a plurality of filter cartridges 104. These cartridges are suspended from a horizontal divider wall 106 within which there are openings which open to the interior of the filter cartridges 104.

The upper edge 102 of the filter module 18 lies in a plane which is also inclined to horizontal at an angle of approximately 30°. A compressible elastomeric seal or gasket is mounted on the edge 102. The filter module is supported from four corner posts 105 at the bottom of which there is mounted a side rail 108. Rollers 109 are mounted beneath each of the side rails 108 to support the filter module for rolling movement into and out of vertical alignment with the underside of the fan plenum 16.

The underside of the filter module opens into two powder collection chambers 110, each of which is shaped as an inverted truncated cone. At the bottom of each of these collection chambers, there is a powder pump 112 operative to pump collected powder from the filter modules back to a feed hopper (not shown) via transport hoses 116. The feed hopper is in turn operative to supply powder to the powder spray guns 20 mounted upon the front of the booth.

Clamping means in the form of a clamp 120 is mounted on each side of the plenum, the clamp having a vertically movable hook 121. This hook is engageable with a lug 122 mounted on each side of the filter module 18 in a position for engagement by the hook when the filter module is positioned under the plenum. By actuating the clamping means, the hook may be pulled upwardly on the lug 122, thereby tightly compressing the elastomeric gasket around the edge of the plenum so as to provide an airtight seal between the plenum and the filter module. Similarly, in this FIG. 2 embodiment wherein the fan plenum is not permanently attached to the booth, clamping means in the form of a clamp 117 is mounted on the sides of each of the front legs 70 of the plenum chamber. A lug 118 is provided on each side of the booth in a position for engagement by a hook 119 of the clamp when the booth is positioned adjacent the fan plenum. By actuating the clamp 117, the hook pulls rearwardly on the lug 118, thereby tightly compressing an elastomeric gasket 114 around the rear edge of the opening 60 in the back of the booth so as to provide an airtight seal between the rear wall of the booth and the opening into the filter module.

The front wall 128 of the powder collector 18 is open except for a pivoted vent 130 which hangs downwardly from an upper edge 132 and partially closes the open front wall opening 134 of the collector 18. The purpose of the pivoted connection of the vent 130 to the top of the front wall of the collector 18 is to permit the vent to swing inwardly into the booth 10 in the event of a fire in the collector, as shown by phantom lines in FIG. 5. By permitting the fire and any resulting pressure build up to vent from the collector into the booth, a potential explosion in the collector is avoided.

The powder collector 12, including the fan plenum 16 and filter module 18, is conventional and known in the prior art. Per se, the powder collector 12 forms no part of the invention of this application. Such a collector is illustrated and described in U.S. Pat. No. 4,498,913 assigned to the assignee of this application.

In order to spray powder onto a target substrate or workpiece moving through the booth on the conveyor 14, while still enabling the booth to be rolled over and beneath the conveyor 14, the powder spray guns 20 are movably mounted upon the front of the booth. To facilitate this movable mounting, each gun 20 is fixedly attached to one end of a pivotable arm 21, the opposite end of which is pivotably mounted in a mounting block 22 secured to the front surface of the front wall 42 of the booth. Each arm 21 is generally L-shaped, having a horizontal section 23 which extends into the booth and a vertical section 24 which extends upwardly or downwardly from the horizontal section to one side of the mounting block 22. The outer end of the arm 21 is bent horizontally and extends into the mounting block 22.

Whenever the booth and powder collector 12 are to be moved away from the conveyor 14 to facilitate cleaning of the booth and conveyor preparatory to a color change, the powder spray guns 20 are moved out of horizontal alignment with the conveyor by pivoting the arms and attached guns about the outer end pivots of the arms to the phantom line positions illustrated in FIG. 5. Those guns which are mounted on the upper portion of the front wall of the booth are pivoted outwardly and upwardly while the guns 20 mounted on the lower section of the front wall are pivoted outwardly and downwardly. In this outwardly-pivoted position of the guns, the assembled collector booth is free to be rolled rearwardly on the rollers 58, 74, 109 to a position remote from the conveyor as illustrated in FIG. 4. In this remote location of the booth, the booth and conveyor may be more conveniently cleaned of old powder preparatory to the spraying of a new color or different composition powder. At the same time, the filter module 18 may be disconnected from the fan plenum and rolled rearwardly relative to the plenum chamber so as to facilitate replacement of the filter cartridges 104 within the module or for replacement of the entire filter module with a second filter module. After cleaning of the filter module and the powder spray booth, the filter module is reconnected to the air plenum, or in the FIG. 2 embodiment, the booth, module and plenum are all reconnected. The reconnected unit is then rolled back into a position in which the upper portion 32 of the booth passes over the spindle conveyor 14 and the lower portion 36 of the booth passes beneath it to the position illustrated in FIGS. 3 and 5. The powder spray guns are then pivoted from the phantom line position illustrated in FIG. 5 to the solid line position where the guns are ready for initiation of a spray cycle. When such a spray cycle is initiated, powder under the control of a control console 125 is caused to be pumped from a feed hopper (not shown) through powder supply lines 126 and 127 to the guns 20. Oversprayed powder from the guns is caused to be sucked from the booth through the opening 60 in the rear wall into the powder collection chambers 110 of the filter module. The air from the booth is separated from the powder by passing the air through the filter cartridges 104 such that clean air emerges from the filters passing upwardly into the lower chamber 80 of the plenum through the suction fan 94 into the upper chamber 95 of the plenum. This clean air then is caused to pass through the final filters 86, 88 to atmosphere. When the air finally emerges from the final filters 86, it is completely purged of any oversprayed powder. The powder collected in the bottom of the collector chamber 110 is then pumped from the collection chamber back to the feed hopper, via hoses 116, preparatory to being recycled back to the spray guns 20.

While we have described only two embodiments of our invention, persons skilled in this art will appreciate changes and modifications which may be made without departing from the spirit of the invention. Therefore, we do not intend to be limited except by the scope of the following claims.

Having described our invention, we claim:

1. A powder spray apparatus comprising
   a powder spray booth having a spray chamber contained internally of the booth,
   a powder collector including a fan plenum and a filter module, said filter module having at least one filter contained within a filter chamber of said module, said filter chamber of said module being open to the interior of said booth and said fan plenum being operable to draw air from said booth and through said filter in said filter chamber,
   vertical supports upon each side of said booth and upon each side of said powder recovery system for supporting said booth and powder recovery system above a floor,
   rollers on the bottom of said vertical supports of said booth and said powder recovery system for facilitating movement of said booth and powder recovery system into and out of alignment with a horizontal conveyor upon which product is to be conveyed through said booth,
   said spray chamber of said booth being defined by a front wall, top wall, rear wall, bottom wall and a pair of side walls, said side walls each having an opening therein extending from the front of said booth toward said rear of said booth,
   an opening in said front wall of said booth, said opening in said front wall of said booth being substantially coextensive with said side wall openings such that a horizontal conveyor may be passed through said front and side openings when said booth is moved on said rollers into alignment with the conveyor.

2. The apparatus of claim 1 which further includes a horizontal conveyor passing through said booth, said conveyor including a plurality of rotatable work-supporting spindles movable over a horizontal path of travel through said booth.

3. The apparatus of claim 1 wherein said filter module has vertical supports mounted upon each side of said module for supporting said module above a floor, and
   rollers on the bottoms of said side supports of said module for facilitating movement of said filter module into and out of engagement with said fan plenum.

4. The apparatus of claim 3 wherein said fan plenum has a lower edge which lies in a plane inclined at an angle to a horizontal plane and said filter module has an upper edge lying in said inclined plane, said edges being engageable when said filter module is rolled beneath said plenum.

5. The apparatus of claim 1 which further includes at least one spray gun mounted on said booth and extending through said front wall opening, and
   means mounting said spray gun for movement into and out of vertical alignment with said front wall opening.

6. The apparatus of claim 5 wherein said mounting means comprises a spray gun mounting arm, said arm having a pair of ends, one end of said arm being attached to said gun and the other end of said arm being mounted for pivotal movement about a horizontal axis such that said arm and attached gun may be pivoted in a vertical plane out of horizontal alignment with said front wall opening.

7. The apparatus of claim 6 wherein said other end of said arm is attached to a horizontal pivot, said horizontal pivot being mounted on said front wall of said booth.

8. The apparatus of claim 1 wherein the walls defining said spray chamber are made of electrically nonconductive material.

* * * * *

UNITED STATES PATENT AND TRADEMARK OFFICE
CERTIFICATE OF CORRECTION

PATENT NO. :    4,590,884
DATED      :    May 27, 1986
INVENTOR(S) :   Kreeger et al.

It is certified that error appears in the above-identified patent and that said Letters Patent is hereby corrected as shown below:

In Column 6, Claim 1, Line 16, "powder recovery system" should be --powder collector--;

In Column 6, Claim 1, Lines 17 and 18, "powder recovery system" should be --powder collector--;

At Column 4, Line 45, "powder collector 18" should be --powder collector 12--;

At Column 4, Line 48, "collector 18" should be --collector 12--, and

At Column 4, Line 50, "collector 18" should be --collector 12--

Signed and Sealed this

Sixteenth Day of March, 1993

Attest:

STEPHEN G. KUNIN

*Attesting Officer*    *Acting Commissioner of Patents and Trademarks*